United States Patent [19]

Sumiyoshi et al.

[11] 4,336,776
[45] Jun. 29, 1982

[54] SWIRL-INDUCING APPARATUS FOR INTERNAL COMBUSTION ENGINES

[75] Inventors: Masaharu Sumiyoshi; Setsuro Sekiya; Katsuhiko Motosugi; Hiroshi Takahashi; Shuhei Toyoda, all of Toyota, Japan

[73] Assignee: Toyota Jidosha Kogyo Kabushiki Kaisha, Toyota, Japan

[21] Appl. No.: 44,254

[22] Filed: May 31, 1979

[30] Foreign Application Priority Data

Jun. 15, 1978 [JP] Japan ................................ 53-72590

[51] Int. Cl.³ ............................................ F02B 31/00
[52] U.S. Cl. ................................ 123/306; 123/188 M
[58] Field of Search ................... 123/188 M, 306, 262; 261/65

[56] References Cited

U.S. PATENT DOCUMENTS

| | | | |
|---|---|---|---|
| 2,436,319 | 2/1948 | Meyer | 261/65 |
| 2,920,613 | 1/1960 | Vogel et al. | 123/188 M |
| 3,274,981 | 9/1966 | Peras | 123/306 |
| 3,457,904 | 7/1969 | Roberts | 123/188 M |
| 3,874,357 | 4/1975 | List et al. | 123/188 M |

FOREIGN PATENT DOCUMENTS

| | | |
|---|---|---|
| 1576012 | 10/1970 | Fed. Rep. of Germany ... 123/188 M |
| 2035939 | 8/1972 | Fed. Rep. of Germany . |
| 2241355 | 2/1974 | Fed. Rep. of Germany . |
| 48-59909 | 6/1973 | Japan . |
| 51-41004 | 8/1976 | Japan . |
| 53-29847 | 7/1978 | Japan . |
| 60523 | 1/1948 | Netherlands ................... 123/188 M |

Primary Examiner—Craig R. Feinberg
Assistant Examiner—W. R. Wolfe
Attorney, Agent, or Firm—Kenyon & Kenyon

[57] ABSTRACT

A throttle valve is positioned at the entrance to a swirl type of suction passage near to the corresponding intake valve of a cylinder in an internal combustion engine. The valve is designed so that when it is opened only slightly (e.g. 30°–40°), the flow of intake gas passing therethrough converges to flow eccentrically along one side of the suction passage. This arrangement provides full control of the intake gas in the suction passage before it reaches the combustion chamber, even when the volume of flow is small, thereby producing an effective swirl within the combustion chamber for all operating conditions of the engine.

8 Claims, 13 Drawing Figures

SWIRL-INDUCING APPARATUS FOR INTERNAL COMBUSTION ENGINES

BACKGROUND OF THE INVENTION

It has been well-known that imparting a swirl to the gas sucked into the combustion chamber of an internal combustion engine will promote the mixing of fuel and air, contributing to improved engine performance by better atomization of fuel and homogenization of the fuel air mixture and an increased speed of flame propagation. Expecially now when the practice of lean burning and high-volume EGR (exhaust gas recirculation) has become widespread for the purposes of exhaust gas purification and fuel saving, swirling the intake gas is found particularly effective.

The conventional means for this purpose include the so-called "helical port" (i.e., an engine suction port designed in a helical configuration which causes the intake gas passing through the gas to swirl as it is introduced into the combustion chamber) or the so-called "eccentric swirl port" (i.e., a suction port which opens into the combustion chamber in a direction tangential to the cylinder wall), so that a swirl may be created in the incoming gas as it flows along the cylinder wall.

In these conventional means, which are intended for high-speed high-load operation, a swirl can be satisfactorily produced by controlling the flow with only the suction port, in the engine work range of medium-speed medium-load to high-speed high-load where the intake gas volume is large; but in the idling and low-speed low-load general working range where the intake gas volume is small and the gas density is low, it is difficult to control the flow of intake gas and accordingly to produce a sufficient swirl in the combustion chamber. Although the form of the helical port may be improved so as to produce a sufficient swirl even in the general working range, in that case the flow resistance will naturally increase to an enormous value, and the volume efficiency will drop, this drop being greater, the higher the engine rpm. For this season said conventional means is virtually inapplicable to the gasoline engine, which runs at an extremely high speed, and its use has been limited to diesel engines, which rotate at a far lower rpm than do gasoline engines.

SUMMARY OF THE INVENTION

The present invention relates to a suction passage means of an internal combustion engine which can produce a swirl of the gas entering into the combustion chamber.

The present invention aims at providing a suction passage means which can produce a sufficient swirl of intake gas over the entire range of operation, without a drop in the volume efficiency, even in a high-speed gasoline engine.

The present invention results from the discovery that, even when the volume of flow is small, the intake gas can be well guided by the suction port if the gas flow is made to converge eccentrically along the suction port wall instead of flowing over the entire sectional area of the port. According to the present invention, the above condition is satisfied by locating a throttle valve means close to the intake valve, so that when the flow of intake gas is small, the gas passing through the throttle valve means can flow along the suction port wall as a converged eccentric flow, and this eccentric flow can be well maintained up to the intake valve.

In the present invention, different combinations of suction port configuration, throttle valve type, and their relative location are available. The embodiments to be illustrated below are only several ones of these combinations and accordingly anything other than illustrated here will be covered by the present invention, so long as the above distinctive feature is involved.

The other objects and features of the present invention will become apparent from the description of the examples to be illustrated later.

DETAILED DESCRIPTION OF THE PREFERRED EMBODIMENTS

Figure 1:
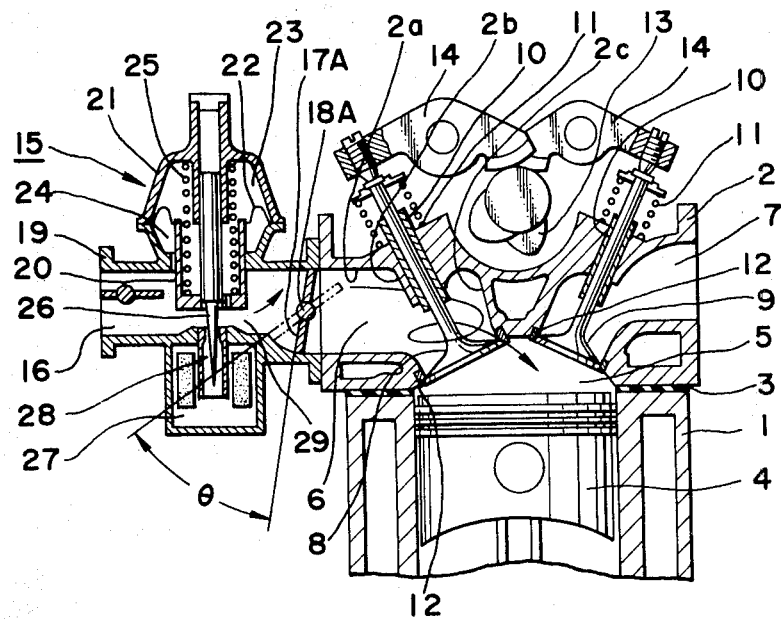
FIG. 1 is a longitudinal section view of the first embodiment of the present invention.
Figure 2:
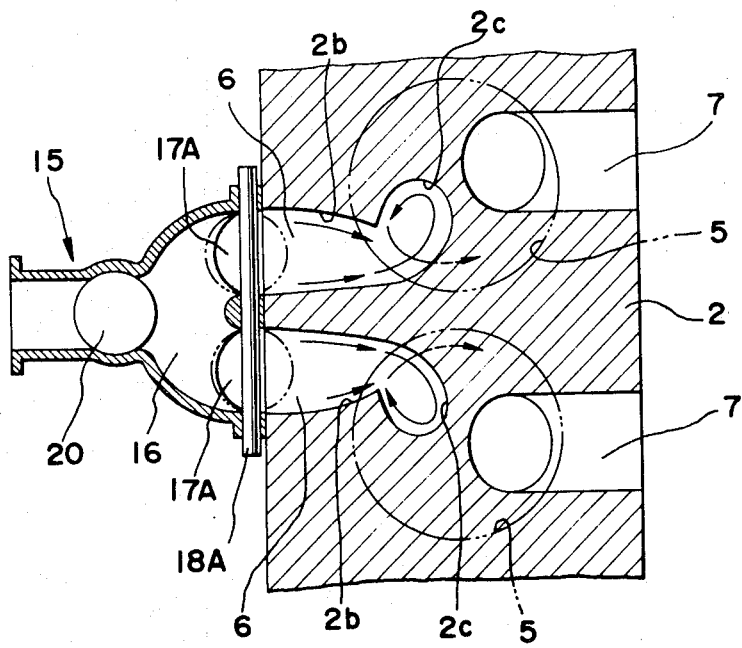
FIG. 2 is a schematic section view of a plane along the suction passage of FIG. 1.

In FIGS. 1 and 2 illustrating a first embodiment of the present invention, 1 is an engine cylinder block; 2 is a cylinder head mounted on and fastened to the cylinder block 1 through a gasket 3; and 4 is a piston slidably inserted into the cylinder, these three items 1, 2 and 4 bounding a combustion chamber 5. In the cylinder head 2 are formed a suction port 6 and an exhaust port 7, both opening into the combustion chamber 5. An intake or suction valve 8 and an exhaust valve 9 to open and close said ports 6 and 7 are slidably held in respective valve guides 10. Said two valves 8 and 9 are urged by respective springs 11 to close, that is, to sit on respective valve seats 12 forming the opening edge of said two ports 6 and 7 into the combustion chamber 5; so that when a cam 13 turns, said valves are opened or closed by means of a rocker arm 14.

As later described in detail, the suction port 6 is a helical port to which a carburetor 15 is directly coupled, without an intervening suction manifold. Said carburetor 15 is an SU type which has a variable venturi, and the engine suction passage is formed by the inlet path 16 of the carburetor and the suction port 6. As indicated in FIG. 2, since one carburetor is employed to supply the fuel and air mixture to two combustion chambers 5, said inlet path 16 forks into two branches at the discharge side. Within said inlet path 16 just downstream of the fork, i.e., close to each intake valve 8, is installed a throttle valve 17A. Thus for each suction port 6 there is provided one throttle valve 17A. The two throttle valves 17A are jointly supported on one rotatable shaft 18A in the body 19 of the carburetor 15 so that when said shaft 18A is rotated, as by operation of an acceleration pedal (not shown) linked to the shaft, they are turned to open or close each suction passage.

The remainder of the carburetor 15 is conventional. Briefly, a suction piston 20, displaceable in a vertical direction (FIG. 1) is positioned upstream of the throttle valve 17A, with one end (bottom in FIG. 1) of the piston jutting into the inlet path 16 and the other end being connected to a diaphragm 22 stretched between the body 19 and a cap 21 fixed thereto.

A suction chamber 23 disposed above said diaphragm 22 communicates with the inlet path 16; an air chamber 24 disposed below the diaphragm 22 communicates with the atmosphere; and the suction piston 20 comes to rest at a position where a force due to the pressure difference between the two chambers 23 and 24 balance the force of a spring 25. A metering needle 26 attached to the bottom of the suction piston 20 enters the main jet 28 of a fuel nozzle communicating with a float chamber 27. In this arrangement, when the negative pressure (i.e., suction) changes, and the suction piston 20 displaces, the effective opening area of the venturi 29 created below the piston also changes. In consequence, the volume of air flowing through the passage also changes, but the air velocity at the venturi 29 remains approximately constant regardless of the air flow volume. A volume of fuel proportional to the air volume is sucked from the main jet 28, and a combustion mixture of constant air/fuel ratio is conveyed downstream.

As stated above, said suction port 6 is helical, but it is designed to cause a small resistance to flow, so that the volume efficiency will not drop at high engine rpm. As described later in detail, if the sucked gas flow is controlled only by the form of the suction port 6, without relying on the action of the throttle valve 17A, sufficient swirl will be generated only with a large volume flow.

Throttle valve 17A is a butterfly type; one part of the bottom wall of inlet path 16 is curved to form a sphere centered on the axis of shaft 18, so that the throttle valve will open progressively only from the top side at small valve opening angles, that is, up to a valve open angle of about 30°-40° (as shown in FIG. 1).

Next the function of the above device will be described. First, assume a throttle setting for medium-speed medium-load operation or high-speed high-load operation. Then the effective open area of the venturi 29 will be enlarged, and at the same time the open angle $\theta$ of the throttle valve 17A will become greater than 30°-40°, resulting in an increased volume of intake gas flowing through suction port 6. In consequence, the flow of intake gas as it passes through the suction port 6 will be controlled, and it will enter the combustion chamber 5 after a swirl has fully developed in the flow.

In the general working range such as idling or low-speed low-load running, the effective open area of the venturi 29 is narrow, and the open angle of the throttle valve 17A reduces to less than 30°-40°, resulting in a decreased volume of intake gas flowing through the suction port 6. In addition, the intake gas from venturi 29 passes only through the narrow opening at the top of the throttle valve 17A, causing the gas to converge as an eccentric flow deviating from the central axis of the suction passage. It is thereby guided along the wall of suction port 6 into the combustion chamber 5. Thus, even in this case when the flow volume is small, the incoming gas will be guided by the form of the suction port 6 to enter the combustion chamber 5 after a swirl has fully developed in the flow. Especially when the eccentric flow is guided along the top wall 2a of the suction port 6 as illustrated, from the nature of a helical port a swirl can be most efficiently developed sequentially by the fairing wall 2b and the peripheral wall 2c. It is for the purpose of maintaining said eccentricity of flow up to the combustion chamber 5 that the throttle valve 17A is located close to the suction valve 8. If the diameter of the suction port 6 is d, the distance l between the valves 17A and 8 will suffice at $l \leq 4d$, and this relation holds equally in the succeeding examples.

Figure 3:
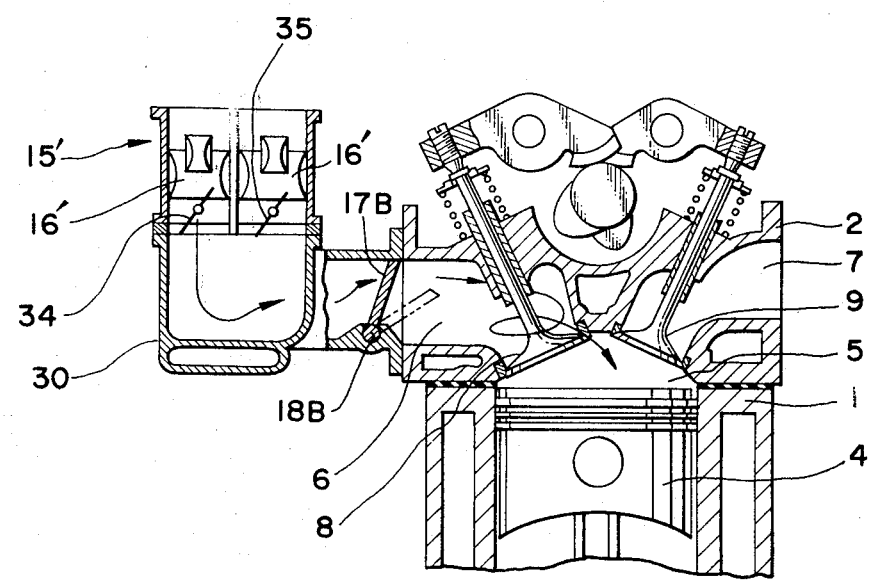
FIG. 3 is a longitudinal section view of a second embodiment of the present invention.
Figure 4:
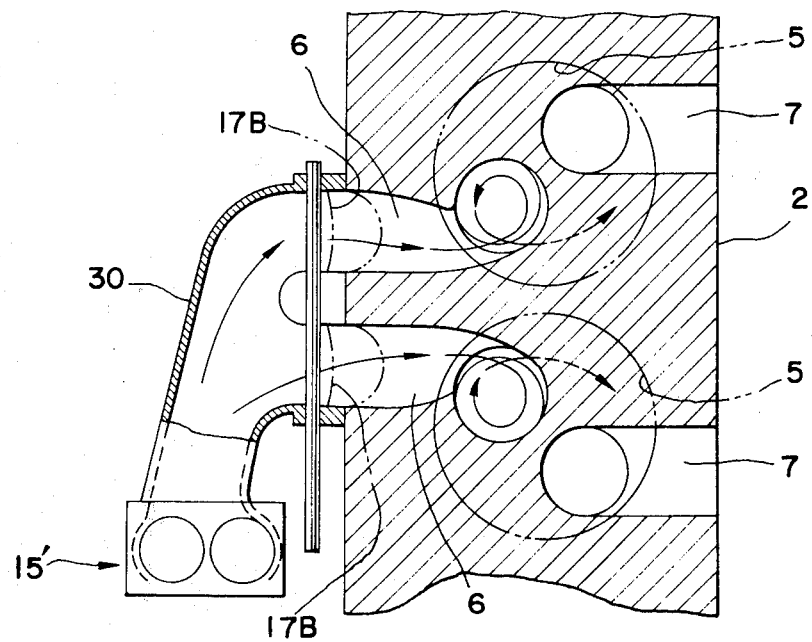
FIG. 4 is a schematic section view of a plane along the suction passage of FIG. 3.

FIGS. 3 and 4 illustrate a second embodiment of the present invention, and like parts carry like symbols (this is also true with the other embodiments). In this embodiment, the suction port 6 is helical as in the first embodiment, but the carburetor 15' is a fixed venturi type, i.e., a two-barrel carburetor with two inlet paths 16', which is connected to the suction port 6 via an intake or suction manifold 30. The throttle valve 17B is eccentrically mounted to open on one side, and it is located within said suction manifold 30 to bring it close to the intake valve 8. In particular, throttle valve 17B has its bottom side (FIG. 3) attached to a rotatable shaft 18B, located at the bottom of inlet plath 16'. In this example, throttle valve 17B is linked with the throttle valves 34, 35 provided in the carburetor 15'. If the carburetor is a fixed venturi single-barrel type (not shown), only the eccentric throttle valve 17B may be needed, with the valves 34, 35 omitted. Said throttle valve 17B is designed to open progressively only from the top side. The function of this embodiment, being the same as of the preceding embodiment, will not be described here.

Figure 5:
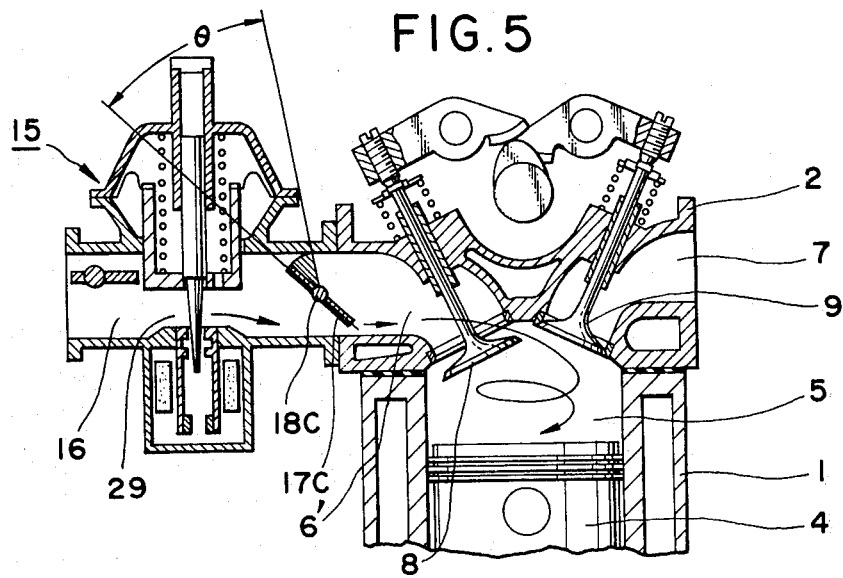
FIG. 5 is a longitudinal section view of a third embodiment of the present invention.
Figure 6:
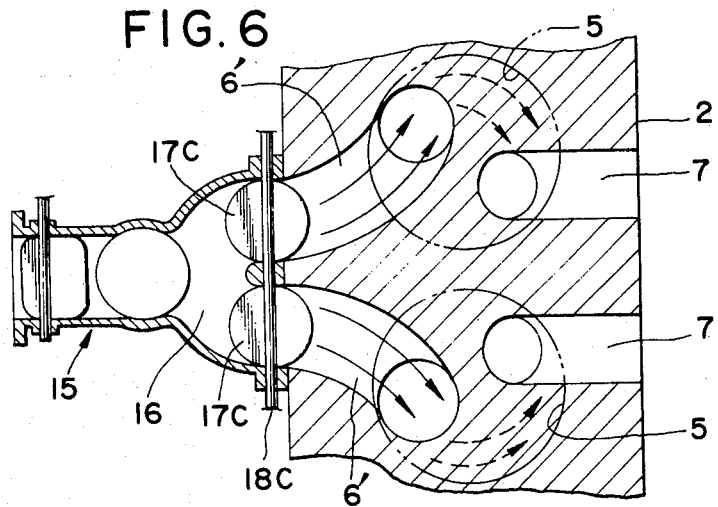
FIG. 6 is a schematic sectional view of a plane along the suction passage of FIG. 5.
Figure 7:
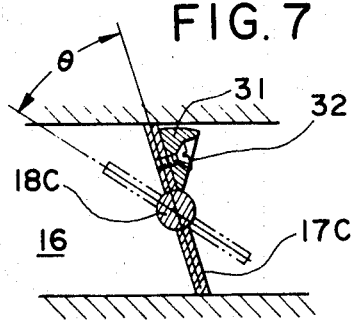
FIG. 7 is an enlarged view of the throttle valve illustrated in FIG. 5.
Figure 8:
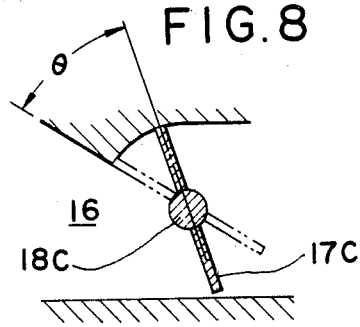
FIG. 8 is an enlarged view of a variation of the throttle valve.

FIGS. 5 and 6 illustrate a third embodiment of the present invention. In this example, the suction port 6' an eccentric swirl type. Namely, as viewed from the top in FIG. 6, the suction port 6' is curved to make approximately an angle of 45°-90° between its inlet and its outlet, so that the incoming gas may flow into the cylinder approximately in a direction tangential to the side wall of the cylinder 1. Throttle valve 17C is a butterfly valve mounted on a diametral rotatable shaft 18c to open at both top and bottom. As shown in FIG. 7, a sealing member 31 with wedge-like section is secured by a screw 32 to the upper side of valve 17C, so that up to an open angle in the range of 30°-40° the valve can open progressively only from the lower side. Instead of providing the sealing wedge member 31, one part of the top wall of the inlet path 16 may be formed in an arc centered on the axis of shaft 18C, as illustrated in FIG. 8. Also, depending on the form of the suction port 6', said throttle valve 17C may be arranged so that it will open progressively only from the upper side instead of the lower side.

The operation of the third embodiment is as follows. At an open angle of throttle valve 17C greater than 30°-40°, corresponding to an increased flow volume of combustible mixture, the suction port 6' fully controls the flow direction to become tangential to the wall surface of the cylinder 1 and consequently develop a sufficient swirl for thorough mixing of the intake gas as it flows along the side wall of the cylinder 1. When the throttle valve 17C is open to a smaller angle than 30°-40° and the volume flow of intake gas drops, the gas then flows along the bottom wall of the suction port 6' as an eccentric flow converged by the throttle valve 17C. Therefore, in this case, too, a sufficient swirl can be developed in the combustion chamber 5 by the combination of the throttle valve 17C and the suction port 6' fully controlling the flow.

Figure 9:
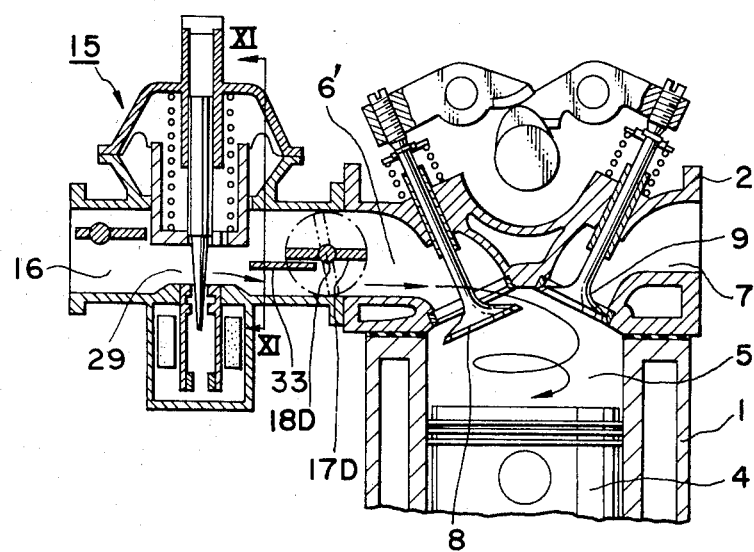
FIG. 9 is a longitudinal section view of a fourth embodiment of the present invention.
Figure 10:
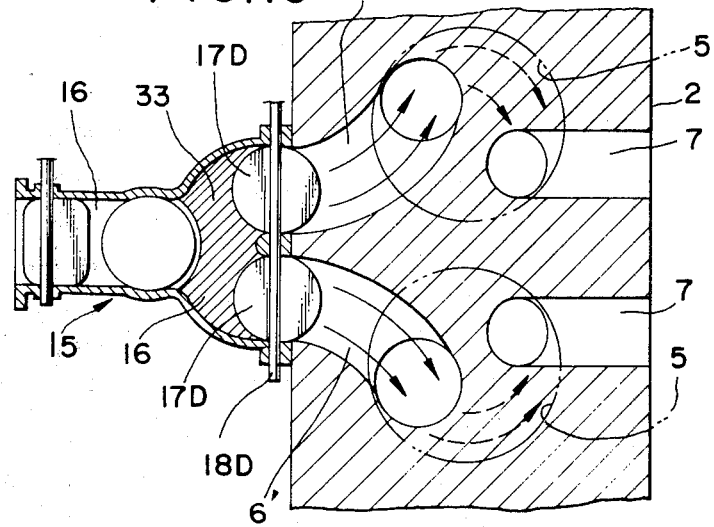
FIG. 10 is a schematic section view of a plane along the suction passage of FIG. 9.
Figure 11:
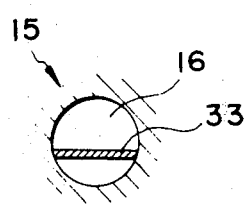
FIG. 11 is a section at XI-XI of FIG. 9.

FIGS. 9, 10 and 11 illustrate a fourth embodiment of the invention. This differs from the third embodiment in that the throttle valve 17D is a simple butterfly type opening at both top and bottom, and that between said throttle valve 17D and the suction piston 20 is positioned a plate-like fairing means 33 which divides the inlet path 16 into two almost equal parallel parts, upside and downside, with the rotatable shaft 18D of the throttle valve 17D as the center. In this embodiment, while the throttle valve 17D is open to a small angle, the upward displacement of suction piston 20 is small, and accordingly the incoming gas from the venturi 29 flows only on the downside of the fairing means 33 and reaches the bottom opening of the throttle valve 17D, where it converges to an eccentric flow. Thus even when the volume flow of intake gas is small, a sufficient swirl can be developed in the combustion chamber 5 just as in the third embodiment. When the throttle valve 17D opens to a large angle, and the volume flow of intake air is large, the suction piston 20 is displaced upward enough so that the incoming gas flows both on the upside and downside of the fairing means 33, reaching the suction port 6' through the openings at both top and bottom of the throttle valve 17D and there developing an equally sufficient swirl.

Figure 12:
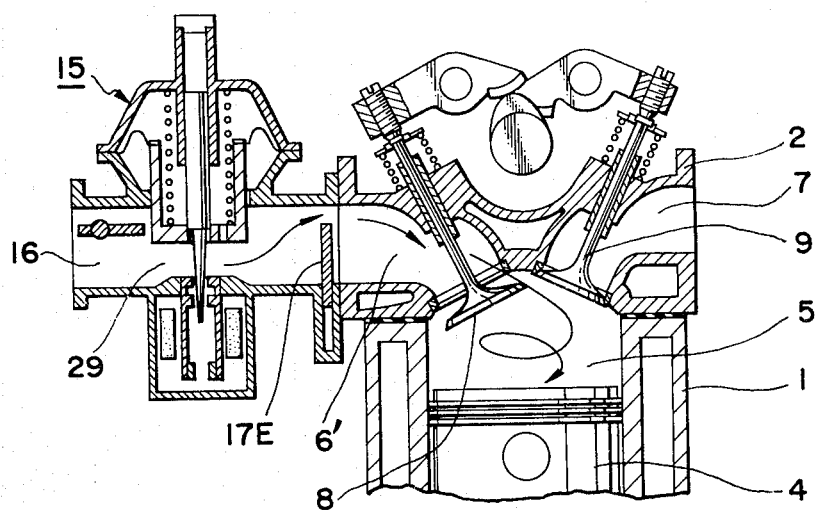
FIG. 12 is a longitudinal section view of a fifth embodiment of the present invention.
Figure 13:
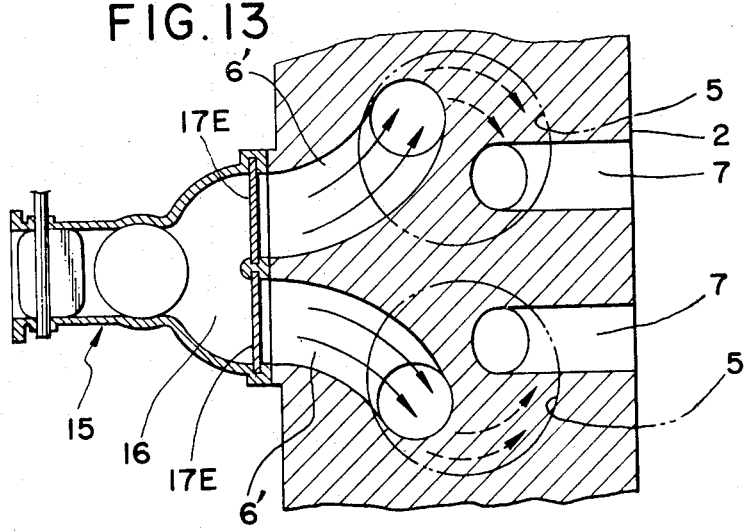
FIG. 13 is a schematic section view of a plane along the suction passage of FIG. 11.

FIGS. 12 and 13 illustrate a fifth embodiment of the present invention, in which, just as in the third and fourth ones, the suction port 6' is an eccentric swirl port, but the throttle valve 17E is a slide valve which can freely move across the inlet path 16. This valve is designed to open from the upside. Thus when the incoming gas flow is small, it becomes an eccentric flow converged along the top wall of the suction port 6', and being controlled thereby until it enters into the combustion chamber 5, it develops a sufficient swirl.

The above examples do not exhaust the embodiments of the present invention which includes, for instance, the following additional variations:

(a) a mass-flow carburetor, a fuel injector and the like are available as the device to supply fuel in the suction passage, in addition to the items illustrated in the examples.

(b) Application is not confined to a gasoline engine, but can be extended to a diesel engine. In the latter case it goes without saying that the intake gas will be air alone instead of a fuel/air mixture.

As described above, the present invention makes it possible in the general working range with small volume flows of intake gas to improve the function of the suction port to control the gas flow without increasing the flow resistance, by converging the intake gas to an eccentric flow. Therefore, even in a high speed gasoline engine, a sufficient swirl can be developed in the combustion chamber over the entire working range without decreasing the volume efficiency. Hence, the following benefits can be gained from the present invention:

(1) High-volume EGR, lean burning, and high-volume residual gas burning become possible with high thermal efficiency, improved operation, and low fuel cost. Especially, since the harmful contents of exhaust gas can thus be decreased to a great extent, a very great practical benefit can be obtained in an application to the gasoline engine, which is subjected to strict control of exhaust gas emissions.

(2) Location of the throttle valve close to the intake valve makes it possible to do without an intake manifold, to reduce the size and weight of an engine and contribute to lower cost.

(3) It follows from (2) that the suction passage can be shortened, resulting in a better transient response of the engine and a decreased output of HC in the exhaust during deceleration.

We claim:

1. Apparatus for imparting a swirl to a flow of intake gas entering a cylinder of an internal combustion engine, the apparatus including an engine having a cylinder block which contains at least one cylinder, a cylinder head fastened to the block and having an intake valve seat for each cylinder, and a swirl-inducing suction passage for each cylinder, each suction passage having an upstream end communicating with a source of intake gas and a downstream end opening into the respective cylinder through the corresponding intake valve seat, wherein the improvement comprises:

throttle valve means mounted in each suction passage close to the intake valve port for opening and shutting the suction passage to regulate the rate of flow of intake gas therethrough, the swirl-inducing suction passage between the throttle valve means and the intake valve being in the form of a helical port and the throttle valve means being a butterfly valve arranged to rotate about an approximately horizontal diametral axis transverse to the intake mixture flow direction in the suction passage, the valve having a downstream-opening portion on the upper side of the suction passage and an upstream-opening portion on the lower side of the suction passage, the apparatus further comprising means for preventing flow past the upstream-opening portion in the general working range from idling through low-speed, low-load operation to concentrate the flow on the upper side of the passageway only through an initial opening range corresponding to engine operating conditions from idling through low speed, light-load, for converging the intake gas to flow eccentrically along said upper side of the passage from the throttle valve means to the intake valve seat to enhance the swirl imparted by the swirl-producing suction passage at low flow volumes, and said suction passage being opened on both sides of said approximately horizontal diametral axis upon further rotation of the throttle valve beyond said initial opening range, to distribute flow through substantially the entire intake port cross section at higher engine speeds and loads.

2. Apparatus according to claim 1 wherein the ratio of length to diameter of each suction passage between the throttle valve means and the intake valve seat is less than four.

3. Apparatus according to claim 1 wherein said means for preventing flow past said valve on the side opposite to said one side comprises a sealing means attached to the butterfly valve on the other side of the suction passage, said sealing means including an extension of the sealing edge of the valve over an angle corresponding to said initial opening range; so that initially the valve can open from said one side only, and thereafter it can open from the other side too.

4. Apparatus according to claim 1 wherein said means for preventing flow past said valve on the side opposite said one side comprises a protrusion from the wall of the suction passage opposite said one side, said protrusion having a sealing surface which is arcuate in longitudinal section and concentric with the axis of rotation of the butterfly valve.

5. Apparatus according to claim 1 wherein the engine contains at least two cylinders, and said throttle valve means for the correspondisng suction passages further comprise a single shaft upon which the butterfly valves of both suction passages are secured for simultaneous rotation by the shaft.

6. Apparatus according to claim 1 wherein each helical swirl-inducing suction port is disposed entirely within the cylinder head, and the respective throttle valve means is located adjacent to the entry to said suction port in the cylinder head.

7. Apparatus according to claim 6, further comprising fuel supply means directly connected to each suction port in the cylinder head without any intervening intake manifold, said fuel supply means including the respective throttle valve means.

8. Apparatus according to claim 6 wherein the engine block contains at least two cylinders, the apparatus further comprising fuel supply means having an intake manifold for distributing intake gas to at least two of said cylinders, and the throttle valve means is located in said intake manifold.

* * * * *